(12) United States Patent
Mitchell

(10) Patent No.: US 7,432,339 B2
(45) Date of Patent: Oct. 7, 2008

(54) INFERRED WATER ANALYSIS IN POLYPHENYLENE SULFIDE PRODUCTION

(75) Inventor: Kent Edward Mitchell, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 11/963,936

(22) Filed: Dec. 24, 2007

(65) Prior Publication Data

US 2008/0103271 A1    May 1, 2008

Related U.S. Application Data

(62) Division of application No. 11/064,373, filed on Feb. 22, 2005, now Pat. No. 7,312,300.

(51) Int. Cl.
  C08G 75/14   (2006.01)
  C08G 75/00   (2006.01)

(52) U.S. Cl. .................. 528/373; 528/378; 528/379; 528/492; 528/499; 528/502 R; 528/502 C; 528/503

(58) Field of Classification Search .............. 528/373, 528/378, 379, 492, 499, 502 R, 502 C, 503
See application file for complete search history.

(56) References Cited

U.S. PATENT DOCUMENTS

| | | | |
|---|---|---|---|
| 3,867,357 A | 2/1975 | Campbell | |
| 4,025,496 A | 5/1977 | Anderson et al. | |
| 4,056,515 A | 11/1977 | Vidaurri, Jr. | |
| 4,060,520 A | 11/1977 | Irvin | |
| 4,324,886 A | 4/1982 | Edmonds, Jr. et al. | |
| 4,370,470 A | 1/1983 | Vidaurri et al. | |
| 4,415,729 A | 11/1983 | Scoggins et al. | |
| 5,023,315 A | 6/1991 | Ceuvorst et al. | |
| 5,093,469 A | 3/1992 | Senga | |
| 5,438,115 A | 8/1995 | Fahey et al. | |
| 5,856,533 A | 1/1999 | Sweeney et al. | |
| 6,201,097 B1 | 3/2001 | Geibel et al. | |
| 6,242,501 B1 | 6/2001 | Green et al. | |

FOREIGN PATENT DOCUMENTS

| EP | 0 339 621 | 4/1989 |
|---|---|---|
| EP | 0 448 194 | 4/1996 |

*Primary Examiner*—Duc Truong
(74) *Attorney, Agent, or Firm*—Fletcher Yoder

(57) ABSTRACT

A method for producing polyphenylene sulfide (PPS) polymer, including polymerizing reactants in a reaction mixture in a vessel to form PPS polymer in the vessel, measuring values of operating variables of the vessel and/or PPS process, and determining the amount of quench fluid to add to the vessel based on the values of the operating variables. The technique may rely on the vapor liquid equilibrium (VLE) of the mixture to calculate the concentration of water existing in the reactor prior to quench, and accounts for the effectiveness of the upstream dehydration process and in the amount of water produced during the polymerization. The technique is a striking improvement over the trial-and-error estimation of the amount of quench water based on human operating experience, and avoids direct measurements of the existing water concentration in the reactor. The result is improved control of PPS particle size and other properties.

12 Claims, 6 Drawing Sheets

INFERRED WATER ANALYSIS IN POLYPHENYLENE SULFIDE PRODUCTION

CROSS REFERENCE TO RELATED APPLICATIONS

This is a divisional application of application U.S. Ser. No. 11/064,373 filed Feb. 22, 2005 now U.S. Pat. No. 7,312,300.

BACKGROUND OF THE INVENTION

1. Field of the Invention

The present technique relates generally to production of polyphenylene sulfide (PPS). In particular, the present technique relates to determining water content in a PPS reactor based on reactor variables.

2. Description of the Related Art

This section is intended to introduce the reader to various aspects of art which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Polyphenylene sulfide (PPS), also known as poly(arylene) sulfide, is a high-performance engineering thermoplastic that may be heated and molded into desired shapes in a variety of manufacturing, commercial, and consumer applications. PPS may be used in the preparation of fibers, films, coatings, injection molding compounds, and fiber-reinforced composites, and is well-suited for demanding applications in appliance, automotive, and electrical/electronic industries. PPS may be incorporated as a manufacturing component either alone or in a blend with other materials, such as elastomeric materials, copolymers, resins, reinforcing agents, additives, other thermoplastics, and the like. Initially, PPS was promoted as a replacement for thermosetting materials, but has become a very suitable molding material, especially with the addition of glass and carbon fibers, minerals, fillers, and so forth. In fact, PPS is one of the oldest high-performance injection-molding plastics in the polymer industry, with non-filled grades commonly extruded as coatings.

PPS polymer, including semi-crystalline PPS, is an attractive engineering plastic because, in part, it provides an excellent combination of properties. For example, PPS provides for resistance to aggressive chemical environments while also providing for precision molding to tight tolerances. Further, PPS is thermally stable, inherently non-flammable without flame retardant additives, and possesses excellent dielectric/insulating properties. Other properties include dimensional stability, high modulus, and creep resistance. The beneficial properties of PPS are due, in part, to the stable chemical bonds of its molecular structure, which impart a relatively high degree of molecular stability, for example, toward both thermal degradation and chemical reactivity.

The general molecular structure of PPS is a polymer composed of alternating aromatic (phenylene) rings and sulfur atoms (in a para substitution pattern), as shown below.

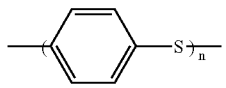

The molecular structure may readily pack into a thermally stable crystalline lattice, giving PPS that is a semi-crystalline polymer with a high crystalline melting point of up to about 285° C. and higher. Because of its molecular structure, PPS also tends to char during combustion, making the material inherently flame retardant, as mentioned. Further, the material will typically not dissolve in solvents at temperatures below about 200° C.

Though PPS was first discovered in the late 19th century, many engineers failed in their attempts over the years to produce PPS for industrial use, and thus the history of PPS as an industrial material is relatively short. In 1967, however, Phillips Petroleum Company of Bartlesville, Okla. devised a method for producing PPS through the synthesis of para-dichlorobenzene and sodium sulfide, as described below.

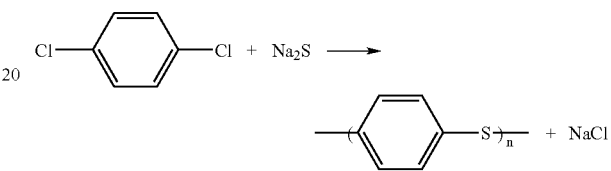

This condensation polymerization (or step polymerization) marked the beginning of industrial-scale commercialization of PPS. In 1972, Phillips Petroleum Company began commercial-scale production of PPS, and this PPS was soon noted for having an effective balance of thermal and chemical resistances, nonflammability, and electrical properties. Today, PPS is manufactured and sold under the trade name Ryton® by Chevron Phillips Chemical Company LP of The Woodlands, Tex.

In general, PPS may be prepared by reacting a dihalogenated aromatic compound with a sulfur source under polymerization conditions in the presence of a polar organic compound. The polar organic compound, such as N-methyl pyrrolidone (NMP), is generally an organic solvent that maintains the reactants and PPS polymer in solution during the polymerization. A molecular weight modifying agent, such as an alkali metal salt, may be optionally added to the polymerization mixture. Typically, the polymerization reaction mixture comprises aqueous and organic phases, with the PPS polymer dissolved primarily in the organic phase. Generally, after the majority of reactants have polymerized, the reaction mixture may be cooled to terminate the polymerization and to drop the PPS polymer solid from solution. Such cooling of the polymerization may be accomplished, for example, by reducing the pressure of the reaction mixture to flash the polar organic compound (e.g., NMP), or by adding more NMP to the mixture to cool (quench) the mixture. The choice of flashing the existing NMP or quenching with more NMP may depend upon the design of the particular manufacturing plant, as well as the particular grade of PPS. Moreover, the choice may affect the process economics, as well as the polymer bulk properties, morphology, particle size, and the like.

Another process alternative in the termination step is to cool (or quench) the polymerization by adding water to the reaction mixture. A water quench, relative to an NMP quench, typically results in a larger particle size of the PPS, which may facilitate separation of the PPS product from undesirable solid components formed in the polymerization since the undesirable components, e.g., residual salt and slime, typically have a relatively small particle size. A problem with water quench, however, is that if too much water is added, the PPS particle size (average diameter) may become too large for downstream separation/handling equipment, resulting in damage or shutdown of the equipment, off-spec production of PPS, contamination of the PPS, and so forth. Conversely, if too little water is added, the PPS particle size may be too small, resulting in losses of PPS escaping with the separated stream of undesirable components.

To complicate matters, the amount of water existing in the reactor immediately prior to quench varies and is typically unknown. Furthermore, it is the total amount of water in the reactor, and not just the amount of quench water added, that affects the PPS properties. Water may exist in the reactor prior to quench because of inefficiencies in the upstream dehydration of the feedstock entering the reactor and because water may be a product of the PPS (condensation) polymerization in the reactor.

General correlations are known between the total amount water in the reactor during quench versus the generated PPS particle size, but again, the determination of how much quench water to add is problematic because the amount (and concentration) of existing water is typically unknown. In the PPS manufacturing process, the human operator typically guesses, based on experience, trial-and-error, "feel" of the operating conditions, and so forth, as to how much water exists in the reactor and as to how much quench water to add.

It should be noted that laboratory or on-line sampling of the reactor mixture to test for the water content may be problematic due to the harsh reactor conditions. Further, it may be difficult to obtain a representative sample of the reaction mixture which may comprise partially-dispersed aqueous and organic phases. Also, testing may be expensive and time-consuming. Moreover, during sampling and analysis, the polymerization may proceed and conditions may change, sometimes undesirably.

Lastly, it should be explained that the PPS polymer may remain substantially dissolved in the reactor solution even after the quench liquid is added. In this case, after the quench liquid is added, the reactor contents may be cooled with a reactor coolant system to precipitate the PPS. If the right amount or type of quench liquid is not added initially, the PPS particles that drop from solution during the controlled cooling may not be the desired size. Generally, there is not a second chance to adjust the amount of quench water or the particle size of the PPS polymer.

In conclusion, the determination of the amount of water existing in the reactor prior to quench is problematic because, in part, other liquid components, such as NMP, are present. Thus, a conventional volumetric measurement, for example, such as through the use of reactor level indication, gives the volume of the mixture and not just the volume of the water. There is a need, therefore, for a technique to determine the amount of water existing in the reactor prior to quench (or cool down) of the reaction. The technique should further determine how much quench water to add to the reaction mixture to control the total amount of water in the reactor during quench to give the desired particle size and other properties of the PPS.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

Figure 1:
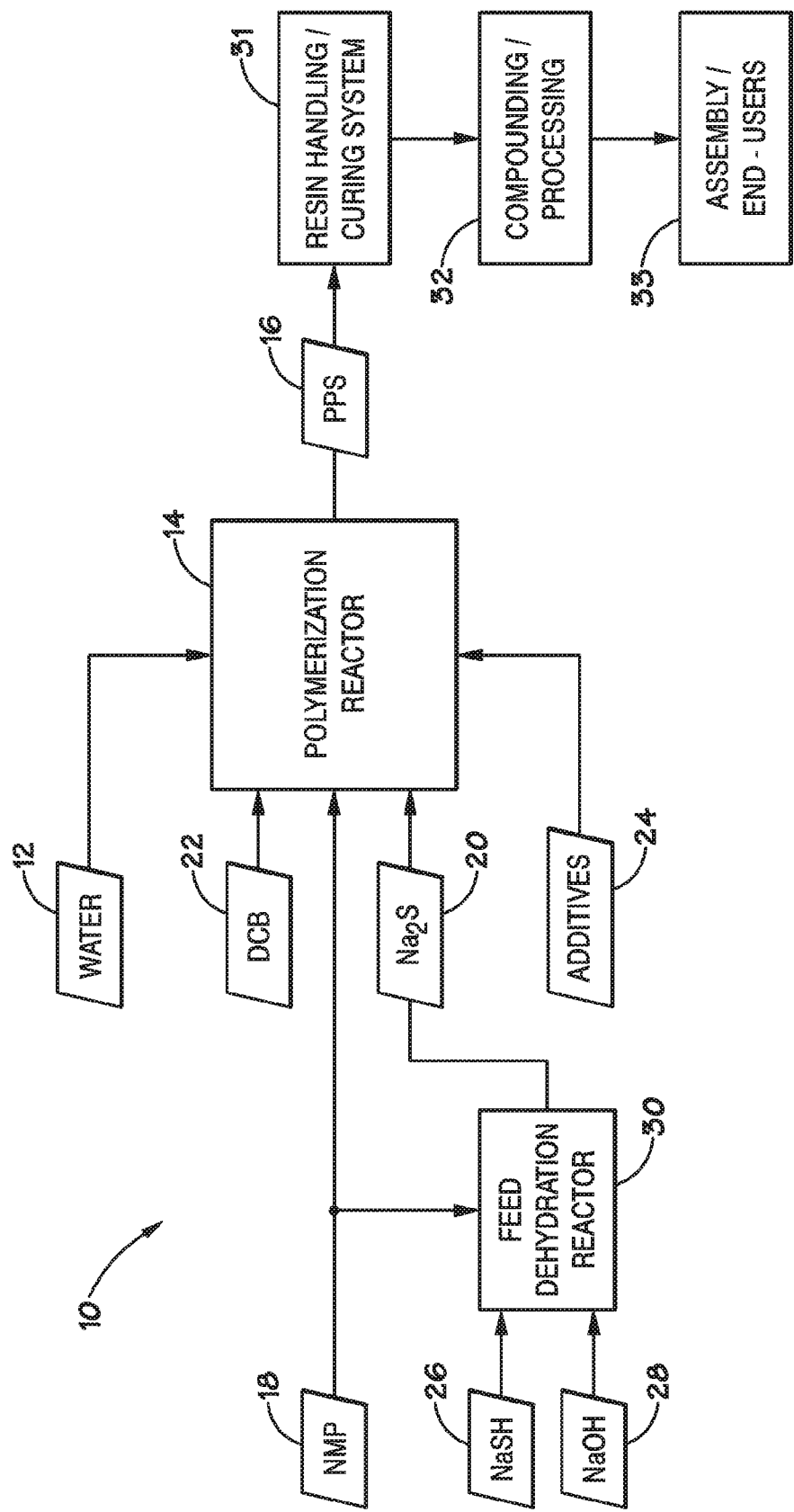
FIG. 1 is a block flow diagram depicting an exemplary system for producing polyphenylene sulfide (PPS) in accordance with one embodiment of the present techniques.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In order to facilitate presentation of the present technique, the disclosure is broken into a number of sections. Section I introduces the PPS process and techniques for determining the amount of quench water. Section II discusses components and conditions of exemplary PPS polymerization mixtures. Section III discusses equipment and methods employed in the exemplary production of PPS, as well as, applications and end-uses of the PPS polymer. Finally, Section IV discusses techniques for the determination of the amount of quench water to add to the PPS polymerization reactor to give the desired PPS particle size.

I. Introduction

It was established early in the development of the PPS water quench process that the total amount of water in the PPS polymerization reactor during the water quench is important to the control of the polymer particle size, bulk density, and fines generation, and other properties of the PPS polymer. It is generally known for the various grades and types of PPS, the relationship between the amount (i.e., pounds, gallons, or concentration) of total water in the reactor during quench versus the PPS particle size (i.e., average diameter in microns). A problem is that the amount of water (and concentration of water) in the polymerization reactor immediately prior to quench is typically unknown to the operator. In response, the present technique can calculate the approximate water content in the polymerization reactor prior to quench, and can provide the correct amount of quench water to add to the reactor to yield the desired PPS particle size (expressed as an average or median particle size, a particles size distribution, and so on). As discussed below, the technique utilizes information about the vapor liquid equilibrium (VLE) of the polymerization mixture to calculate the concentration of water existing in the reactor prior to quench. The calculation may be based on reactor system variables, e.g., reactor temperature and pressure, and accounts for variations, for example, in the effectiveness of the upstream dehydration process and in the amount of water produced during the polymerization.

In one embodiment, the liquid mixture in the reactor 14 is assumed to be an ideal binary mixture of water and NMP, and the vapor phase is assumed saturated, i.e., the liquid and vapor phases are assumed to be in equilibrium. With these assumptions, and with reactor pressure and reactor temperature as inputs, Raoult's Law may be used to calculate the concentration of water ($x_A$) in the reactor mixture:

$$P = P°_A x_A + P°_B x_B \qquad \text{Raoult's Law}$$

where P is the total pressure in the reactor (a measured value), $P°_A$ and $P°_B$ are the pure-component vapor pressures of water and NMP, respectively, and $x_A$ and $x_B$ are the liquid mole fractions of water and NMP, respectively. As discussed below, the pure-component vapor pressures may be calculated using a suitable vapor pressure equation, such as Antoine's equation, with reactor temperature as an input. Finally, because the mixture is assumed binary, the expression $(1-x_A)$ may be substituted for $x_B$, and thus $x_A$, the mole fraction of water, may be solved. With the mole fraction of water determined, the amount of water existing in the reactor may then be calculated based on the liquid volume in the reactor. The amount of quench water may then be determined based on the desired total amount of water that gives the desire PPS particle size.

The technique is a striking improvement over the trial-and-error estimation of the amount of quench water based on human operating experience, and avoids the drawbacks associated with direct measurement of the existing water concentration in the reactor. The result is improved and more effective control of the average diameter or particle size (or particle size distribution) of PPS in the polymerization reactor. The technique generally avoids the generation of undesirably small particles of PPS and thus facilitates separation of the prime PPS product from the reject material, such as salt and slime, which tend to have a smaller particle size. Further, the improved control of particle size lowers the generation of undesirably large particles that may damage downstream separation equipment and that may result in increased downtime and increased maintenance costs. In sum, the technique provides for improved PPS product quality, reduced PPS losses, reduced downtime, reduced operating and maintenance costs, and so forth.

II. Polymerization of Polyphenylene Sulfide (PPS)

A. Components of the PPS Polymerization Reaction Mixture

PPS polymers may be produced generally by contacting under polymerization conditions at least one dihaloaromatic compound, a sulfur source, and a polar organic compound.

1. PPS Polymerization Reactants

Two primary reactants are the dihaloaromatic compound and the sulfur source.

a. Dihaloaromatic Compound as a PPS Reactant

Some of the dihaloaromatic compounds which may be employed may be represented by the formula:

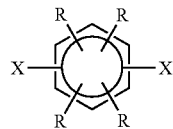

where each X may be selected from chlorine, bromine, and iodine, and each R may be selected from hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24. While the halogen atoms can be in any position in the dihaloaromatic compound, it is common in the art to employ p-dihalobenzenes as the dihaloaromatic compound. Examples of p-dihalobenzenes that may be used include p-dichlorobenzene (DCB), p-dibromobenzene, p-diiodobenzene, 1-chloro-4-bromobenzene, 1-chloro-4-iodobenzene, 1-bromo-4-iodobenzene, 2,5-dichlorotoluene. 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromo-benzene, 1-hexyl-3-dodecyl-2,5-dichlorobenzene, 1-octadecyl-2,5-diiodobenzene, 1-phenyl-2-chloro-5-bromobenzene, 1-(p-tolyl)-2,5-dibromobenzene, 1-benzyl-2,5-dichlorobenzene, 1-octyl-4-(3-methylcyclopentyl)-2,5-dichloro-benzene, and the like, and mixtures of any two or more thereof. A typical dihaloaromatic compound employed in the polymerization of PPS is p-dichlorobenzene (DCB) due to its availability and effectiveness.

b. A Sulfur Source as a PPS Reactant

Sulfur sources which may be employed in the PPS polymerization process include, for example, thiosulfates, thioureas, thioamides, elemental sulfur, thiocarbamates, metal disulfides and oxysulfides, thiocarbonates, organic mercaptans, organic mercaptides, organic sulfides, alkali metal sulfides and bisulfides, hydrogen sulfide, and the like. It is common in the art to use an alkali metal sulfide as the sulfur source, which may include lithium sulfide, sodium sulfide, potassium sulfide, rubidium sulfide, cesium sulfide, and mixtures thereof. Generally, the alkali metal sulfide may be used as a hydrate or as an aqueous mixture. For an aqueous mixture, as discussed below, the alkali metal sulfide can be prepared by the reaction of an alkali metal hydroxide with an alkali metal bisulfide in aqueous solution. A common alkali metal sulfide used as the sulfur source in PPS polymerization is sodium sulfide (Na2S), which may be prepared by combining sodium hydrosulfide (NaSH) and sodium hydroxide (NaOH) in an aqueous solution followed by dehydration.

2. Polar Organic Compounds (Including Organic Solvents)

Useful polar organic compounds in the production of the PPS polymers are typically those that are solvents for the dihaloaromatic compounds and the sulfur source, and thus those that keep the dihaloaromatic compounds and sulfur source in solution during the polymerization. In general, examples of such polar organic compounds include amides, including lactams, and sulfones. In particular, the polar organic compounds may include hexamethylphosphoramide, tetramethylurea, N,N'-ethylenedipyrrolidone, N-methyl-2-pyrrolidone, pyrrolidone, caprolactam, N-ethylcaprolactam, sulfolane, N,N'-dimethylacetamide, 1,3-dimethyl-2-imidazolidinone, low molecular weight polyamides, and the like. The polar organic compound typically used is N-methyl-2-pyrrolidone (NMP).

3. Other Components (Including Additional Reactants)

Other components may be employed in the polymerization reaction mixture and/or during the polymerization. For example, molecular weight modifying or enhancing agents such as alkali metal carboxylates, lithium halides, or water can be added or produced during polymerization. Alkali metal carboxylates which may be employed include those having the formula R'CO2M where R' is a hydrocarbyl radical selected from alkyl, cycloalkyl, aryl, alkylaryl, arylalkyl, and the number of carbon atoms in R' is in the range of 1 to about 20, and M is an alkali metal selected from lithium, sodium, potassium, rubidium and cesium. The alkali metal carboxylate may be employed as a hydrate or as a solution or dispersion in water. A commonly-used alkali metal carboxylate in the PPS process is sodium acetate (NaOAC) due to its availability and effectiveness.

Additionally, reactants, such as comonomers, may be included as well. Such comonomers typically include polyhaloaromatic compounds having more than two halogen atoms, such as trichlorobenzene. For example, polyhalo-substituted aromatic compounds having more than two halogen substitutions may be employed as reactants in order to prepare branched, relatively high molecular weight poly(arylene sulfide) polymers. It is common in the art to use 1,2,4-trichlorobenzene (TCB) as the polyhalo-substituted compound when employed.

Further, a base may be employed as a reactant, for example, where the sulfur source employed is an alkali metal bisulfide. If a base is used, alkali metal hydroxides, such as sodium hydroxide (NaOH), may typically be utilized. Additionally, an acidic solution may be added to the reaction mixture prior to termination of the polymerization to reduce the basicity of the reaction mixture. Such a reduction in basicity may lower the amount of ash-causing polymer impurities in the PPS polymer.

B. Conditions of the PPS Polymerization Reaction Mixture

1. Ratio of Reactants

Generally, the ratio of reactants employed in the polymerization process may vary widely. However, the typical molar ratio of dihaloaromatic compound to sulfur source is generally in the range of about 0.8 to about 2, and more commonly from 0.95 to 1.3. The amount of polyhalo-substituted aromatic compound optionally employed as a reactant may be that amount to achieve the desired degree of branching to give the desired polymer melt flow. Generally, about 0.0004 to 0.02 moles of polyhalo-substituted aromatic compound per mole of dihaloaromatic compound may be employed. If an alkali metal carboxylate is employed as a molecular weight modifying agent, the mole ratio of alkali metal carboxylate to dihaloaromatic compounds may be generally within the range of about 0.02 to about 4, more commonly from about 0.1 to 2.

2. Ratio of Solvent and Base to the Sulfur Source

The amount of polar organic compound employed may also vary during the polymerization over a wide range. However, the molar ratio of polar organic compound to the sulfur source is typically within the range of about 1 to 10. If a base, such as sodium hydroxide, is contacted with the polymerization reaction mixture, the molar ratio is generally in the range of about 0.5 to about 4 moles per mole of sulfur source.

3. Reaction Conditions

The components of the reaction mixture can be contacted with each other in any order. Some of the water, which may be introduced with the reactants, may be removed prior to polymerization, such as in a dehydration process, especially if a significant amount of water (e.g., more than 0.3 moles per mole of sulfur source) is present. Moreover, the temperature at which the polymerization is conducted is generally within the range of about 170° C. (347° F.) to about 450° C. (617° F.), more commonly from about 235° C. to about 350° C. Further, the reaction time may vary widely, depending, in part, on the reaction temperature, but is generally within the range of about 10 minutes to 3 days, more commonly from about 1 hour to about 8 hours. Typically, the reactor pressure need be only sufficient to maintain the polymerization reaction mixture substantially in the liquid phase. Such pressure will generally be in the range of about 0 pounds per square inch gauge (psig) to about 400 psig, more commonly about 150 psig to about 250 psig.

C. Termination of the Polymerization Reaction and Recovery of the PPS

The polymerization may be terminated to begin recovery of the PPS from the reaction mixture by cooling the reaction mixture (removing heat) to a temperature below that at which substantial polymerization takes place (about 235° C.). The polymerization reaction mixture may be cooled, for example, by flashing the polar organic compound (e.g., NMP). Alternatively, the reaction mixture may be cooled by quenching, such as by adding more polar organic compound or by adding water to the reaction mixture. The reaction may also be terminated in a variety of other ways, such as by contacting the reaction mixture with a polymerization inhibiting compound. It should be clarified that termination of the polymerization does not imply that complete reaction of the polymerization components has occurred. Moreover, termination of the polymerization is not meant to imply that no further polymerization of the reactants can take place. Generally, for economic reasons, termination (and PPS polymer recovery) may be initiated at a time when polymerization is substantially completed, that is, when the increase in polymer molecular weight which would result from further polymerization is not significant.

For recovery of the polymer, the cooling and termination of the reaction brings the PPS polymer solids out of solution, which may then be separated from the reaction mixture by conventional procedures. Such procedures include, for example, filtration of the polymer followed by washing with water, or dilution of the reaction mixture with water followed by filtration and water washing of the polymer. In general, the polymers may be recovered by the "flash" process, by employing a separation agent, by mechanical separation, and so forth.

The recovered PPS polymer may be further processed. For example, the PPS may be cured through cross linking and/or chain extension by heating at temperatures above about 480° C. in the presence of free oxygen-containing gas. Agents that affect crosslinking, such as peroxides, crosslinking accelerants, and/or crosslinking inhibitors, may be incorporated into the PPS. Such cured PPS polymer generally has high thermal stability and good chemical resistance, and are useful, for example, in the production of coatings, films, molded objects and fibers. Additionally, the PPS polymer may ultimately be blended with various additives, such as polymers, fiber reinforcements, fillers, pigments, nucleating agents, antioxidants, UV stabilizers, heat stabilizers, carbon black, metal deactivators, lubricants, plasticizers, corrosion inhibitors, mold release agents, pigments, titanium dioxide, clay, mica, processing aids, adhesives, tackifiers, and the like. Ultimately, the PPS polymer may be formed or molded into a variety of components or products for a diverse range of applications and industries. Such components and products may be further processed, assembled, shipped, etc. prior to receipt by an end-user.

It should be clarified that the PPS polymer, in both flash and quench processes, is generally in solution prior to termination of the polymerization in the reactor. In the flash process, the reactor solution may be charged to a flash vessel where the NMP is flashed off, leaving the PPS polymer, as well as salt and other undesirable components. Thus, it is the flash process that facilitates precipitation of the PPS. In the quench process, however, the PPS polymer may remain in solution even after quench NMP or quench water is added to the reactor. Therefore, the reactor solution may be further cooled at a controlled rate via a coolant system, for example, to cause the PPS to come out of solution. However, it is the amount of quench water added that effects the particle size distribution of the PPS. In general, higher water content in the reaction mixture results in larger PPS particles precipitating from the reaction mixture during the controlled cooling.

D. Examples of PPS Polymerization

1. First Example of PPS Polymerization

A PPS polymer may be prepared by mixing 32.40 kg (71.42 lbs) of a 50% by weight sodium hydroxide (NaOH) aqueous solution with 39.34 kg (86.74 lbs) of a solution containing 60% by weight sodium hydrosulfide (NaSH) and 0.4% by weight sodium sulfide ($Na_2S$). This solution, 11.34 kg (25 lbs) of sodium acetate (NaOAc) powder, and 104.1 L (27.5 gal) of N-methyl-2-pyrrolidone (NMP) may be added to a stirred (400 rpm) reactor, which may then be purged with nitrogen. This mixture may then be heated to about 172° C. (342° F.) and dehydrated to remove water while the temperature is increased to about 211° C. (411° F.). Then, 63.27 kg (139.49 lbs.) of p-dichlorobenzene (DCB) in 22.7 L (6 gals.) of NMP may be charged to the reactor. The mixture may be heated to about 282° C. (540° F.) and held at temperature for about 1.5 hours. The reaction mixture may then be flashed at about 282° C. (540° F.) to remove the NMP and solidify the PPS polymer. The dry, salt-filled polymer may be twice washed with 454.25 L (120 gal) of deionized water at ambient temperature, then filtered, then washed with 302.83 L (80 gal) of deionized water at 177° C. (350° F.) for 30 minutes. The solution may be filtered to recover approximately 26.76 kg (59 lbs) of PPS.

2. Second Example of PPS Polymerization

This example also illustrates the general preparation of a PPS polymer. A mixture of 72.6 lbs of a 50 weight percent sodium hydroxide (NaOH) aqueous solution with 86.8 lbs of a 60 weight percent sodium hydrosulfide (NaSH) aqueous solution may be prepared, and then added with 25 lbs of sodium acetate (NaOAc) powder, and 27.5 gal of N-methyl-2-pyrrolidone (NMP) to a stirred (400 rpm) reactor. The reactor may be then purged with nitrogen, and the reaction mixture heated to remove water while the temperature increases to about 410° F. Then 135.9 lbs of p-dichlorobenzene (DCB) and 6 gals of NMP may be charged to the reactor. The mixture may then be heated to about 460° F. and held at temperature for about 35 minutes, then was heated to 510° F. and held for 90 minutes, and then finally heated to 540° F.

The reaction mixture may then be removed from the reactor through a control valve into a vessel maintained at a pressure about 1 pounds per square inch (psi) above atmospheric pressure, thereby resulting in the vaporization of most of the NMP and solidification of the PPS polymer. The dry, salt-filled polymer may then be twice washed with 120 gal of deionized water at ambient temperature, then filtered, then washed with about 80 gal of deionized water containing 75 g calcium hydroxide at 350° F. for 30 minutes. The solution may then be filtered to recover the PPS.

3. Third Example of PPS Polymerization

This example also describes the general preparation of a PPS polymer, according to known methods. In this typical PPS preparation, the following may be added to a one-liter stirred stainless steel reactor: 40.97 grams sodium hydroxide (NaOH) pellets of 98.6% purity (1.01 g-mol NaOH) and 40.0 g double distilled water (2.22 g-mol), 95.49 g aqueous sodium bisulfide (NaSH) (58.707% NaSH by weight) (1.00 g-mol), and 198.26 g of n-methyl-2-pyrrolidone (NMP) (2.00 g-mol). The reactor may be degassed with 5 pressure release cycles of 50 psig nitrogen and 5 cycles of 200 psig nitrogen. The reactor and contents may then be heated slowly to 100° C., whereupon the dehydration outlet may be opened and nitrogen flow at the rate of 32 mL/min. initiated. The dehydration may continue while heating to a final temperature of about 204° C. Then the dehydration outlet may be closed and 148.49 g p-dichlorobenzene (DCB) (1.0 g-mol) dissolved in 1.00 g-mol NMP charged to the reactor using a charge cylinder. The charge cylinder was rinsed may be an additional 1 g-mol of NMP which may also be added to the reactor. (The reactor may then be degassed again in the same manner as described above). Further, the reactor may then be heated to polymerization conditions (235° C.) for 2 hours, then the temperature increased to 260° C. for 2 hours to produce PPS.

At the conclusion of the polymerization, the reactor may be cooled to room temperature and the mixture of PPS polymer and NMP may be extracted using isopropanol. The reactor product may be washed with water six times at 90° C. and filtered on a coarse filter paper to recover the PPS product which may be left to dry under a hood for 8-10 hours. The PPS product may then be placed in a vacuum oven and dried at 100° C. for 24 hours to yield 101.23 g of dried PPS polymer product. The expected extrusion rate of this PPS product is 72.71 g/10 min.

III. Production of Polyphenylene Sulfide (PPS)

Turning now to the drawings, and referring initially to FIG. 1, a block flow diagram of an exemplary polyphenylene sulfide (PPS) manufacturing system generally designated by reference numeral 10 is depicted.

A. The Use of Water and NMP

In certain applications, such as in laboratory and pilot scale facilities, the PPS manufacturing system 10 may be configured to accommodate both flash termination (e.g., flash NMP) and quench termination (e.g., NMP or water). However, in general, commercial-scale PPS production facilities are typically designed toward one of flash termination or quench termination. A flash termination design may provide for lower equipment and capital costs, as well as for more straightforward operation. In contrast, quench plants may require more equipment, but may give more versatility in operation and in the production of more diverse properties of the PPS polymer.

For a quench operation, the present techniques determine the amount of water 12 for quenching the reaction in the polymerization reactor 14 to give the desired average particle size and other properties of the polymerized PPS. The water-quench cools the reaction and thus terminates the polymerization, and generally causes the PPS polymer which is typically dissolved in the organic phase to desirably precipitate and fall out of solution. Again, additional cooling may be implemented (e.g., via a reactor coolant system) to facilitate precipitation of the PPS polymer. The PPS polymer product 16 may then be separated from the other components in the reactor 14.

An alternative to a water-quench is to instead quench the polymerization by adding an organic solvent, such as N-methylpyrrolidone (NMP) 18, to the reactor 14. This may be beneficial, for example, where too much water exists in the reactor 14 prior to quench and a where a water-quench would give excessive particle size of the precipitating PPS. Such an excessive particle size may cause downstream handling problems, for example. Thus, NMP 18 may be added instead of water 12 to quench the reaction and to reduce the particle size of the PPS. It should be noted that the present techniques may be employed to determine the amount of water existing in the reactor 14 prior to quench, and thus whether an NMP quench is appropriate (or whether to implement a less typical combination quench employing both water 12 and NMP 18). It should also be noted that other factors may influence the decision of whether to water quench or NMP quench.

Another alternative is to cool the reaction, not by quenching, but through flashing of the organic solvent (e.g., NMP) that may exist in the reactor 14. Such flashing may be accomplished, for example, by reducing the pressure of the reactor 14, or by discharging the contents of the reactor 14 to a lower pressure, and the like. As indicated, relevant equipment in PPS manufacturing systems 10 employing flash termination may be significantly different than those employing quench termination. Nevertheless, it may be beneficial to employ the present techniques to determine the amount of water existing in the reactor 14 prior to flashing the NMP in the reactor 14 to adjust the conditions of the flash, for example.

Finally, regardless of whether the reaction mixture is water-quenched, NMP-quenched, or NMP-flashed to terminate the polymerization, water 12 may also be added after termination to wash the PPS before the PPS leaves the reactor 14. Additionally, the PPS 16 discharged from the reactor 14 may also be washed with water. However, these water washes typically do not affect the particle size of the PPS.

B. Polymerization

As mentioned, PPS may be produced by the condensation polymerization of a sulfur source, such as sodium sulfide (Na$_2$S) 20 with a dihaloaromatic compound, such as para-dichlorobenzene (DCB) 22, in a polymerization reactor 14. Other polymerization modifiers/additives 24, such as sodium acetate, may be added to the reaction mixture. The polymerization is generally exothermic and thus the polymerization reactor 14 may be equipped with a jacket and/or internal cooling coils, which may be supplied with a cooling medium, such as oil, ethylene glycol, propylene glycol, water, and other heat transfer fluids. Finally, agitation of the reaction mixture, such as through the use of a reactor stirrer or agitator, may advance the polymerization by improving contact of the reactants, improving heat transfer, dispersing the aqueous and organic phases, and so forth.

The sodium sulfide 20 may be supplied in the form of aqueous sodium hydrosulfide (NaSH) 26 and aqueous sodium hydroxide (NaOH) 28. These aqueous feedstocks or pre-reactants may be dehydrated in the presence of an organic solvent, such as NMP 18, in a feed dehydration vessel or reactor 30 before polymerization takes place. The temperature at which the dehydration is conducted generally ranges from about 100° C. to about 240° C. The pressure will generally range from slightly above atmospheric up to about 30 psig.

C. Termination and Recovery

As mentioned, termination may be accomplished by allowing the temperature of the polymerization mixture to fall below that at which substantial polymerization occurs, typically below 235° C. After termination of the polymerization reaction the PPS polymers may be recovered by conventional techniques, i.e., filtration, washing, flash recovery, and so forth. Following the typically batch polymerization in the reactor 14, as discussed, the PPS in the reactor can either be flashed or quenched to obtain the desired polymer type or properties of the PPS polymer product 16. Flash-type polymer, in this example, may be formed through flashing the post-reaction mixture to an atmospheric pressure blender where the majority of the NMP is removed. Quench-type polymer may be formed through cooling the reaction mixture by adding additional NMP 18 and allowing the polymer to crystallize as small granules, or by adding water 12 and allowing the polymer to crystallize as relatively larger granules. Subsequent to particle formation, the majority of the NMP and/or water may be removed from the quench-type polymer through the use of a shaker screen, for example. The quenched polymer may be additionally washed with NMP 18 and/or water 12. The NMP used in the various processes may be recycled after being purified via distillation.

D. PPS Polymer and Downstream Processing

After bulk solvent removal, the PPS polymer is generally washed to remove residual impurities including the reaction modifier (if present), by-product sodium chloride (salt), and residual NMP. The polymer may be water-washed with organic acid or inorganic (e.g., calcium source) additives, depending on the specific requirements. Further, the purified polymer is typically dried. The washing and drying of the PPS polymer may take place in the polymerization reactor 14, in associated equipment in the immediate area of the reactor 14, in downstream resin handling/curing systems 31, and so forth.

As used herein, PPS comprises at least 70 mole %, and generally 90 mole % or more of recurring units represented by the structural formula:

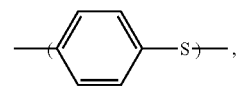

and may comprise up to 30 mole % of recurring units represented by one or more of the following structural formulas:

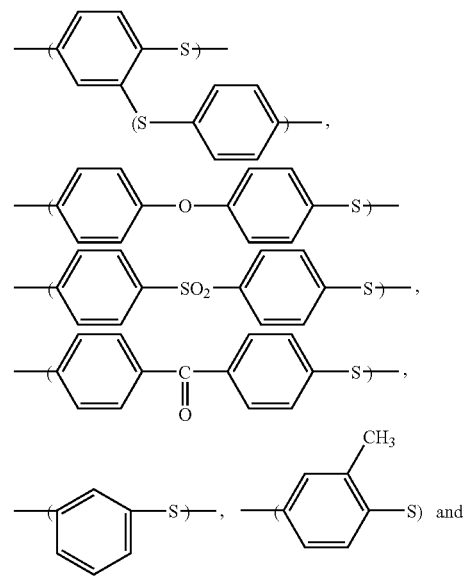

-continued

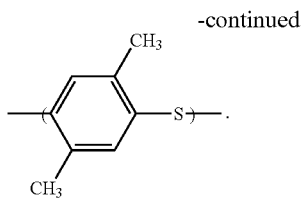

The dried PPS polymer, whether produced on a pilot scale or commercial scale, may be further processed with special washes, blending, curing, and so forth, as referenced in block 31. For example, the polymer may be cured through cross linking and/or chain extension by heating at temperatures above about 480° C. in the presence of free oxygen-containing gas. Moreover, agents that affect crosslinking, such as peroxides, crosslinking accelerants, and/or crosslinking inhibitors, may be incorporated into the PPS. Such cured PPS polymer generally has high thermal stability and good chemical resistance, and are useful, for example, in the production of coatings, films, molded objects and fibers. Further, as referenced in either block 31 or 32, and either on-site or at separate facilities, the PPS polymer may be blended with various additives, such as polymers, fiber reinforcements, glass and carbon fibers, minerals, fillers, pigments, nucleating agents, antioxidants, UV stabilizers, heat stabilizers, carbon black, metal deactivators, lubricants, plasticizers, corrosion inhibitors, mold release agents, titanium dioxide, clay, mica, processing aids, adhesives, tackifiers, and the like.

The PPS may be may be heated and molded into desired shapes and composites in a variety of processes, equipment, and operations, as referenced in block 32. For example, as will be appreciated by those of ordinary skill in the art, the PPS polymer may be subjected to heat, compounding, injection molding, blow molding, precision molding, film-blowing, extrusion, and so forth. Further, additives, such as those mentioned above, may be blended or compounded with the PPS polymer. The output of such techniques may include, for example, polymer intermediates or composites including the PPS polymer, and manufactured product components or pieces formed from the PPS polymer, and so on. These manufactured components may be sold or delivered directly to a user. On the other hand, the components may be further processed or assembled in end products, for example, in the industrial, consumer, automotive, and electrical/electronic industries, as referenced in block 33. Many diversified applications and uses may benefit from the advantageous properties of PPS, and thus an assortment of components or products having PPS polymer may be manufactured or assembled in the different processes and operations represented by blocks 32 and 33.

E. Applications and End-Uses of PPS Polymer

A wide range of appliance products or components incorporating PPS polymer include, for example, electric blanket thermostats, fry pan handles, hair dryer grills, coffee warmer rings, curling iron insulators, steam iron valves, toaster switches, clothes dryer switches, clothes washer pumps, dishwasher pumps, non-stick cookware coatings, and microwave oven turntables, to name a few. Exemplary business appliance products of PPS include printer paper guards, copier gears, fax machine heads, and medical/scientific instrument components. Household and automotive lighting products constructed of PPS include, for example, reflectors, reflector housings, bulb housings, socket bases, and ballast components.

PPS applications in automotive brake systems include antilock brake (ABS) motor components, electric brakes, ABS brake pistons, booster pistons, and valve bodies. Automotive coolant system applications of PPS polymer include heater core tanks, thermostat housings, water pump impellers, extension tubes, valve components, water inlet/outlet connections. Further, automotive electrical system components incorporating PPS include, for example, alternator components, switches, connectors, ignition components, motor brush cards, and sensors. Fuel system applications include fuel flow sensors, fuel pump components, throttle bodies/deactivator, fuel line connectors, fuel rails, and fuel injector bobbins, to name a few. Also, powertrain/transmission components formed from PPS may include lock-up collars, servo pistons and covers, engine gasket carriers, seal housings, shift cams/forks, stators, and transmission pistons.

Electrical and electronic applications of PPS cut across a wide range of residential, commercial, and industrial uses, and include, for example, applications in computer systems, instrumentation and control systems, power supply systems, and so on. More specific examples of components incorporating PPS include electrical connectors, terminal blocks, electrical relays/switches (e.g., relay contact bases), circuit breaker housings, and high temperature housings for electrical components, electronics packaging (e.g., capacitor encapsulation housings), computer memory module sockets, chip carrier sockets, hard disk drive components, to name a few.

PPS may be incorporated in a variety of components and products in commercial and industrial applications. For example, Heating, Ventilation, and Air Conditioning (HVAC) applications of PPS include compressor mufflers, flue collectors, secondary heat exchanger headers, fuel oil pumps, hot water circulation components, power vent components, thermostat components, and so on. Other examples of industrial applications of PPS include centrifugal pump impellers, chemical pump vanes, corrosion resistant coating, and filter bags for flue gas in coal burning plants.

F. PPS Polymerization Reactor

Figure 2:
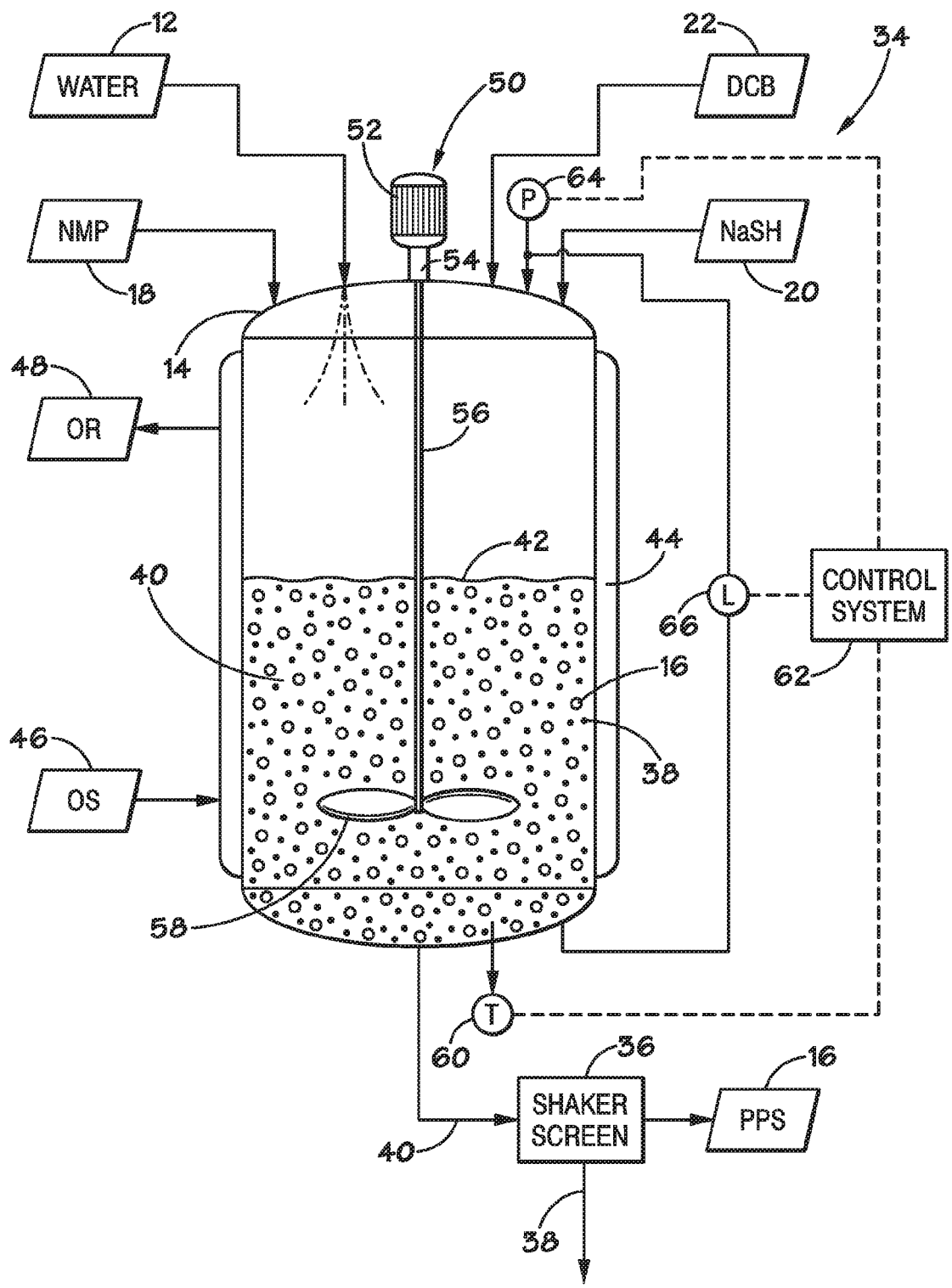
FIG. 2 is a diagrammatical representation of the polymerization reactor depicted in FIG. 1 in accordance with one embodiment of the present techniques.

FIG. 2 illustrates a diagrammatical representation of an exemplary polymerization reactor area 34 including the polymerization reactor 14 of FIG. 1 and a shaker screen 36 for removing undesirable solids 38 from the reactor mixture 40 to give the PPS polymer product 16. The liquid level of the mixture 40 in the reactor 14 is designated by reference numeral 42. In the mixture 40, the depicted larger particles represent the PPS polymer product 16. In contrast, the depicted small particles represent undesirable solids 38, such as salt and slime. During the polymerization, however, the PPS polymer 16 is typically dissolved in the reactor mixture 40 (primarily in the organic phase) and is generally not precipitated until the mixture 40 is cooled.

Normally, the polymerization is exothermic, and thus means for removing heat may be required. In the illustrated embodiment, a reactor jacket 44 removes heat from the reactor contents (e.g., reactor mixture 40). Cooling coils within the reactor may also be employed to remove heat from the reactor mixture 40. A variety of cooling mediums, such as oil and other heat transfer fluids, may be supplied to the reactor jacket 44 and to the internal cooling coils. In this example, the cooling medium is oil, with the oil supply (OS) designated by reference numeral 46, and the oil return (OR) designated by reference numeral 48. An agitator 50 may also be employed to facilitate heat transfer, as well as, to promote contact of the reactants and to help keep the reactor mixture 40 (including the PPS) in solution. The agitator 50 may comprise a motor 52, a drive 54, a shaft 56, an impeller 58, and the like. The agitator 50 may also employ a seal, such as a single or a double mechanical seal. A variety of agitator 50 (or stirrer) configurations may be implemented.

The water 12 that may be used for quenching and other functions, such as washing, is shown introduced at the top of the reactor 14. The various feeds, such as the NMP 18, DCB 22, and Na$_2$S 20, are illustrated as introduced on the top head of the reactor 14. However, the feed entry points may be configured on any suitable part of the reactor 14. Moreover, flow equipment, such as control valves and internal devices (e.g., nozzles, sprayers, spargers, dip tubes), and so forth, may be employed. For example, it may be beneficial to employ an internal dip tube to introduce organic compounds to the reactor 14.

To measure process variables, a variety of instrumentation known to those of ordinary skill in the art may be provided. For example, a temperature element 60, such as a thermocouple or resistance temperature detector (RTD), may be inserted directly into the reactor 14 or into a thermowell disposed in the reactor 14. Temperature indication may be accomplished, for example, with a local gauge coupled to the temperature element 60. In addition or in lieu of a gauge, a temperature transmitter coupled to the temperature element 60 may transmit a temperature signal to a processor or control system 62, such as a distributed control system (DCS) or a programmable logic controller (PLC), where the temperature value may be read by an operator and/or used as an input in a variety of control functions. For example, as discussed below, the temperature indication may be used in the control of the flow rate and/or temperature of the cooling medium (e.g., heat transfer fluid) through the reactor jacket 44 and/or cooling coils to control the reactor temperature. The temperature indication may also be used in the determination of the amount of water in the reactor 14 and in the amount of quench water to add to the reactor 14, and so on.

Further, a pressure element 64, such as a diaphragm or Bourdon tube, may be installed on the reactor 34 to measure pressure. A local gauge may couple to the element 64 to indicate the measured pressure. In addition or in lieu of a gauge, a pressure transmitter coupled to the pressure element 64 may transmit a pressure signal to the control system 62. Thus, as with temperature indication, the indication of reactor 14 pressure may be read locally or remotely by an operator, used to determine the amount of water in the reactor 14, the desired amount of water 12 for quenching, and used in a variety of control functions via the control system 62.

Additionally, the reactor level 42 may be measure by a level element 66, such as the differential pressure meter represented in the illustrated embodiment. Other exemplary level elements 60 may include a variety of sensors, such as capacitance or inductance probes inserted into the reactor. As with reactor 14 pressure and temperature, local or remote level indication may be employed. The indicated level may be used in the determination of the amount of water in the reactor 14, the amount of quench water to add to the reactor 14, and as input for various control purposes via the control system 62, for example.

A variety of other instrumentation and controls may be employed around and on the reactor 14. For example, the flow rate of cooling medium through the reactor jacket 42 and/or coils may be measured with a flow orifice or mass flow meter disposed on the inlet and/or outlet conduits. The flow rate of cooling medium may be full-open or controlled (automatically or manually) via the control system 62 and/or appropriate valve configurations. The desired flow rate may be set to a substantially constant mass or volumetric flow rate, or may be varied to control temperature of the cooling medium return 48 and/or the temperature of the reactor 14, for example.

Further, the metering of the reactor 14 feeds (e.g. water 12, NMP 18, Na$_2$S 20, and DCB 22 feeds) are also typically measured and controlled. Such flow measurement may be accomplished, for example, with a flow totalizer (including mechanical control), or with a mass flow meter or flow orifice (e.g., using differential pressure). Moreover, the flow indication may be based on change in the reactor level 44, and so on. The reactor 14 feeds may be controlled locally or remotely, automatic or manually, and with manual valves or automatic control valves, for example.

In general, a control system 62 and other processor-based systems may control a range of operations in the PPS manufacturing system 10, such as those operations represented in both FIGS. 1 and 2. As will be appreciated by those of ordinary skill in the art, the control system 62 may be configured with the appropriate hardware and software (e.g., code). Further, and in particular, the control system 62 may be configured with hardware/software to automatically read measurements of reactor 14 pressure, temperature, and level, to automatically calculate the amount of water in the reactor 14, and to automatically calculate the desired amount of quench water 12. The control system 62 may also automatically facilitate control the addition of quench water 12 to the reactor 14 via suitable control schemes, for example. Such schemes may rely on software logic and code, as well as on equipment, such as control valves, conduits, instrumentation, etc.

G. PPS Production Method

Figure 3:
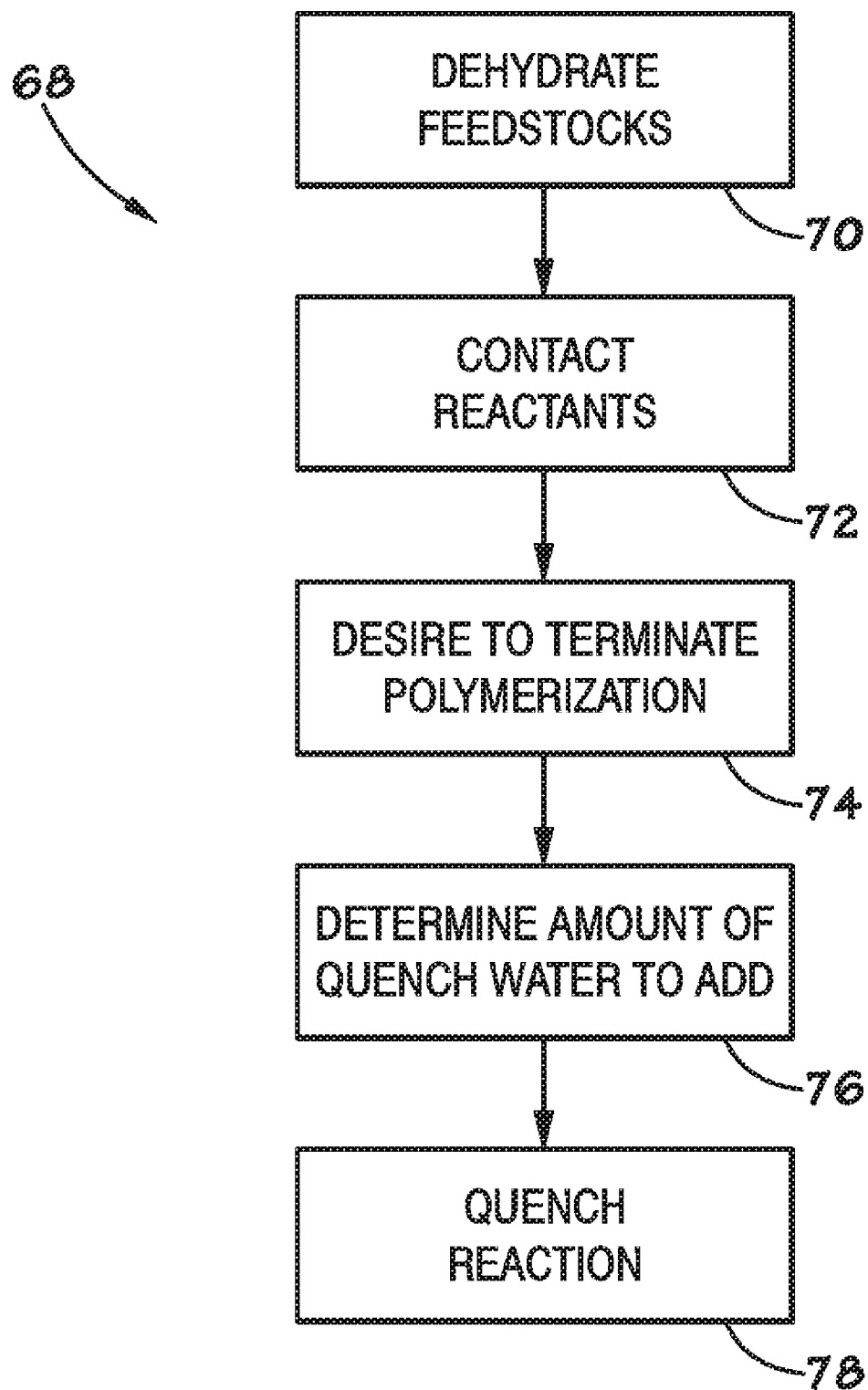
FIG. 3 is a block diagram of an exemplary method for PPS polymerization and subsequent quenching in accordance with one embodiment of the present techniques.

Referring to FIG. 3, a block diagram of an exemplary PPS production method 68 is depicted. Initially, feedstocks with significant water may be dehydrated in a vessel or a reactor (block 70). Then, the reactants and other components, such as the organic solvent, may be contacted in a polymerization reactor (block 72). After polymerization of the reactants to produce the PPS in the reactor 14 (see FIG. 1), it may be desired to terminate the polymerization (block 74). At this point, the amount of quench water for terminating the polymerization may be determined (block 76). As discussed, the PPS properties are impacted by the total amount of water in the reactor (existing water plus quench water), and thus it is desirable to determine the amount of water existing in the reactor prior to quench to determine the amount of quench water to add. The relationship or correlation between the total amount of water in the reactor during the quench versus the PPS particle size is generally known. After the amount of quench water is determined, then the water may be added and the reaction quenched (block 78). It should be noted that additional cooling of the reactor contents, such as by lowering the temperature of the cooling medium in the reactor jacket and/or coils, may be implemented after the quench water is added to facilitate bringing the PPS polymer out of solution.

It should also be noted that the amount of water existing in the reactor prior to quench may be adequate to give relatively large PPS particles. Thus, NMP, instead of water, may be used to quench the reaction. In other words, the calculated amount water in the reactor prior to quench, using the present techniques, may call for no addition of quench water, but instead indicate that a NMP quench is beneficial in lieu of a water quench. Finally, it should be emphasized that the order of the different actions of the production method 68 depicted in FIG. 3 may vary.

IV. Determination of the Amount of Quench Water

In general, the determination of the amount of quench water may utilize the vapor liquid equilibrium (VLE) of the polymerization mixture. A specific relationship that may be employed is Dalton's Law of Partial Pressures, which states that the total pressure of a mixture is equal to the sum of the individual-component partial pressures:

$$P = p^*_A + p^*_B + p^*_C + \ldots \quad \text{Dalton's Law of Partial Pressures}$$

where P it the total pressure and p* is the partial pressures of the individual components. For example, in the present context, the partial pressures of the individual components (e.g., water, NMP, etc.) in the reactor 14 mixture at the reactor temperature sum to equal the reactor total pressure. As discussed below, this relationship may be used to calculate the water concentration in the reactor 14 mixture prior to quench.

The calculation may assume the reaction mixture to be ideal, or conversely, may take into account non-ideal behavior of the mixture, depending on the desired accuracy and/or the conditions of the mixture. As will be appreciated by those of ordinary skill in the art, exemplary corrections for non-ideal behavior include the use of Van der Waals constants, activity coefficients in the liquid phase, pure component fugacities in the vapor and liquid phases, virial equations of state, the Benedict-Webb-Rubin equation, the compressibility factor (equation of state), and so forth.

A. Calculation of the Water Content in the Polymerization Reactor

1. The Use of Raoult's Law to Solve for the Mole Fraction of Water

In one embodiment, the calculation assumes that reaction mixture is an ideal binary mixture of water and the polar organic compound (e.g., NMP). Further, in this example, the calculation assumes that vapor and liquid phases are in equilibrium, and thus the individual-component partial pressures equal the individual-component (or pure-component) vapor pressures. Accordingly, the Dalton's Law of Partial Pressures may be reduced to Raoult's Law:

$$P = P°_A x_A + P°_B x_B \quad \text{Raoult's Law}$$

where P is the total pressure (e.g., reactor pressure), $P°_A$ and $P°_B$ are the pure component vapor pressures (e.g., of water and NMP respectively), and $x_A$ and $x_B$ are the mole fractions of the two components (e.g., water and NMP) in the liquid phase. And because $x_B$ may be expressed as $1-x_A$ in a binary system, the mole fraction of water, $x_A$, may be solved:

$$x_A = (P - P°_B)/(P°_A - P°_B) \quad \text{Mole Fraction of Water Solved}$$

Thus, the mole fraction of water may be calculated based on the total (reactor) pressure P, and the pure-component vapor pressures of $P°_A$ (water) and $P°_B$ (NMP) at the system (reactor) temperature. Therefore, the two basic inputs are reactor pressure and reactor temperature, which are both measured values. The pure-component vapor pressures may be determined using the reactor temperature and a suitable vapor pressure equation, such as Antoine's equation:

$$\log_{10} P° = A - B/(T+C) \quad \text{Antoine's Equation}$$

where P° is the vapor pressure, and A, B and C are Antoine coefficients and vary from substance to substance. The Antoine coefficients (constants) tabulated for water, for example, are A=7.96681, B=1668.21, and C=228.0 for system temperatures, T, in the range of 60 to 150° C. and for vapor pressures, P°, in mm Hg or torr. The Antoine equation is accurate to a few percent for most volatile substances (with vapor pressures over 10 torr).

Further, the pure component vapor pressures (i.e., for both water and NMP) calculated with the Antoine's equation are only a function of the reactor temperature T. For the calculation of quench water, the vapor pressures may typically be calculated based on the reactor temperature immediately prior to quench. However, the calculation methodologies encompassed by the present techniques for vapor pressures and for the amount or concentration of water in the PPS reactor may be employed at any point in process time, i.e., before polymerization, during polymerization, immediately prior to quench, during quench, immediately after quench, long after quench, during washing of the PPS polymer, and so forth. Such calculations may take into account additional variables, such as the presence of precipitated solids, the presence of other liquid components, the existence of non-ideal conditions, and so forth.

Furthermore, other suitable equations may be utilized for determining the pure component vapor pressures. For example, as will appreciated by those of ordinary skill in the art, the Clausius-Clapeyron equation, $\ln P = -\Delta H_{vap}/RT + C$, where R is the gas constant and C is a material constant, may be used to calculate the pure component vapor pressures of both NMP and water, and is a function of the reactor temperature T, and the heat of vaporization $\Delta H_{vap}$. Thus, if this equation is employed, the heat of vaporization may be determined at the temperature of interest, or if empirical data is available, the Clausius-Clapeyron equation may provide for a graphical solution (as is apparent by the linear form of the equation plotted on a logarithmic axis). Other sources of pure-component vapor pressure data include databases, such as databases generated by the AICHE Design Institute for Physical Properties (DIPPR). These types of databases may provide values of the pure-component vapor pressures for NMP and water at the reactor temperature of interest (i.e., immediately prior to quench). In conclusion, it should be emphasized that many methods may be utilized to determine the pure-component vapor pressures.

2. Subtraction to Give the Amount of Quench Water

With the fraction of water calculated, the quench water amount may then be determined by subtracting the amount of existing water from the desired total amount of water during the quench. The data may be converted to accommodate the desired form or units of the calculation, which may employ (1) concentrations, e.g., mole fraction, mass fraction, etc., or (2) mass, e.g., kilograms, pounds, etc., or (3) volume, e.g., gallons, liters, etc., and so forth. In sum, the present technique determines the amount of quench water to add to a polyphenylene sulfide (PPS) polymerization reactor to control particle size and other properties of PPS in the reactor more consistently.

B. A Method for Calculating the Amount of Quench Water

Figure 4:
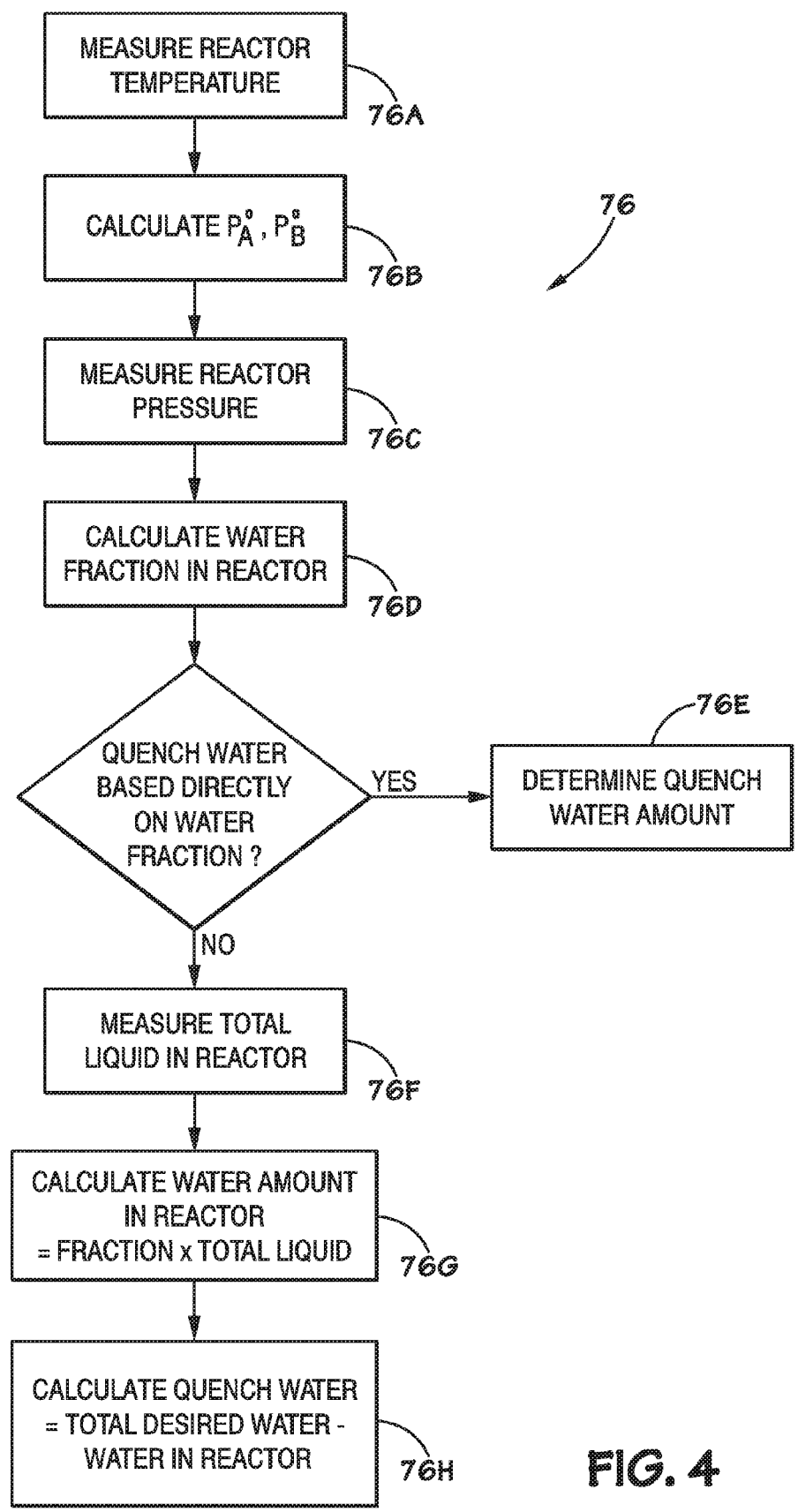
FIG. 4 is a block diagram of an exemplary method for determining the amount of quench water to add at the conclusion of a PPS polymerization in accordance with one embodiment of the present techniques.

FIG. 4 depicts a method 76 that corresponds to block 76 of FIG. 3 and which determines the amount of quench water (or other similar quench fluid) to add a polymerization reactor, such as the polymerization reactor 14 depicted in FIG. 1. In this example, the reactor 14 mixture is assumed to be an ideal binary mixture of water and NMP with saturated vapor. Initially, the temperature of the reactor 14 is measured (block 76A) and used to calculate (block 76B) the pure-components vapor pressures of water ($P°_A$) and NMP ($P°_B$) in the reactor. The pure-component vapor pressure calculation may be performed with Antoine's Equation, for example. Additionally, the pressure of the reactor 14 may be measured (block 76C). Based on this measured pressure of the reactor 14, and on the calculated pure-component vapor pressures, the water fraction in the reactor fluid may be calculated (block 76D) using Raoult's Law, for example, as discussed above.

Figure 5:
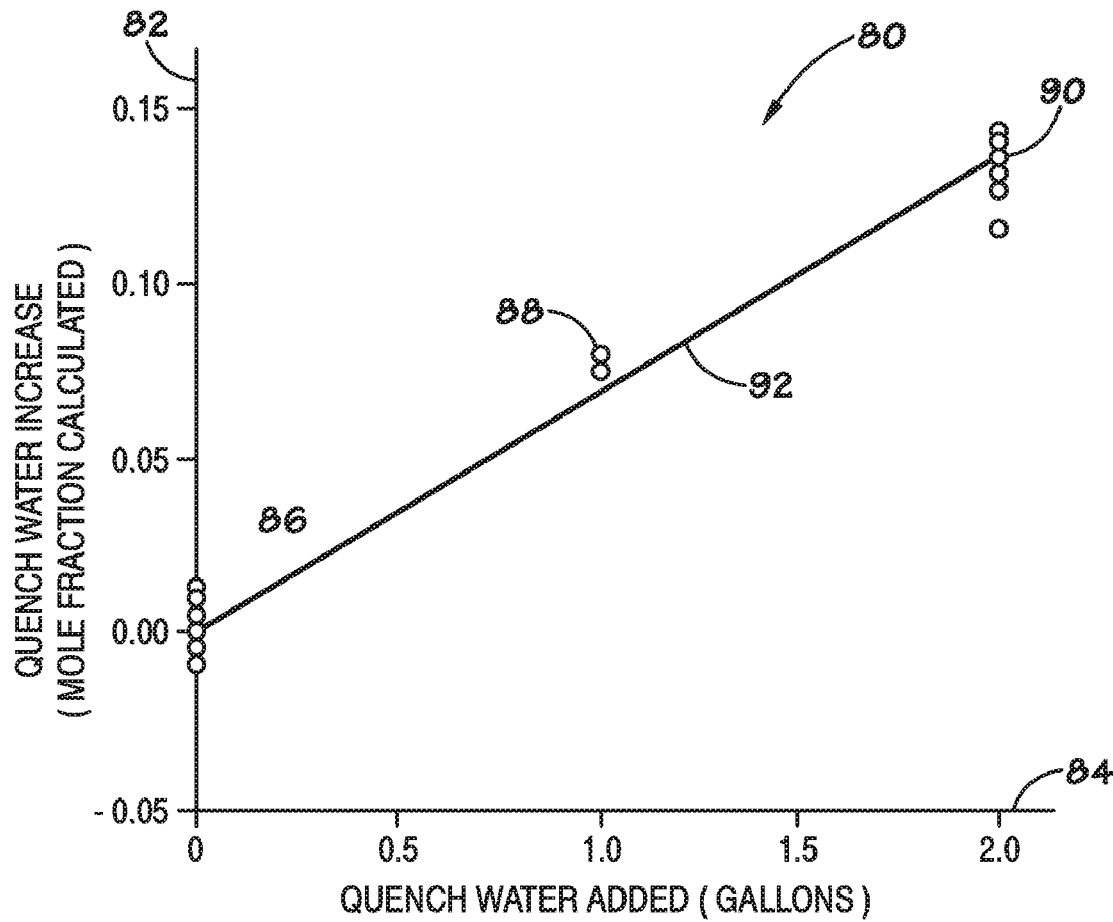
FIG. 5 is a plot of the calculated value for the mole fraction increase of water in the reactor versus the amount of quench water added, in accordance with one embodiment of the present techniques.
Figure 6:
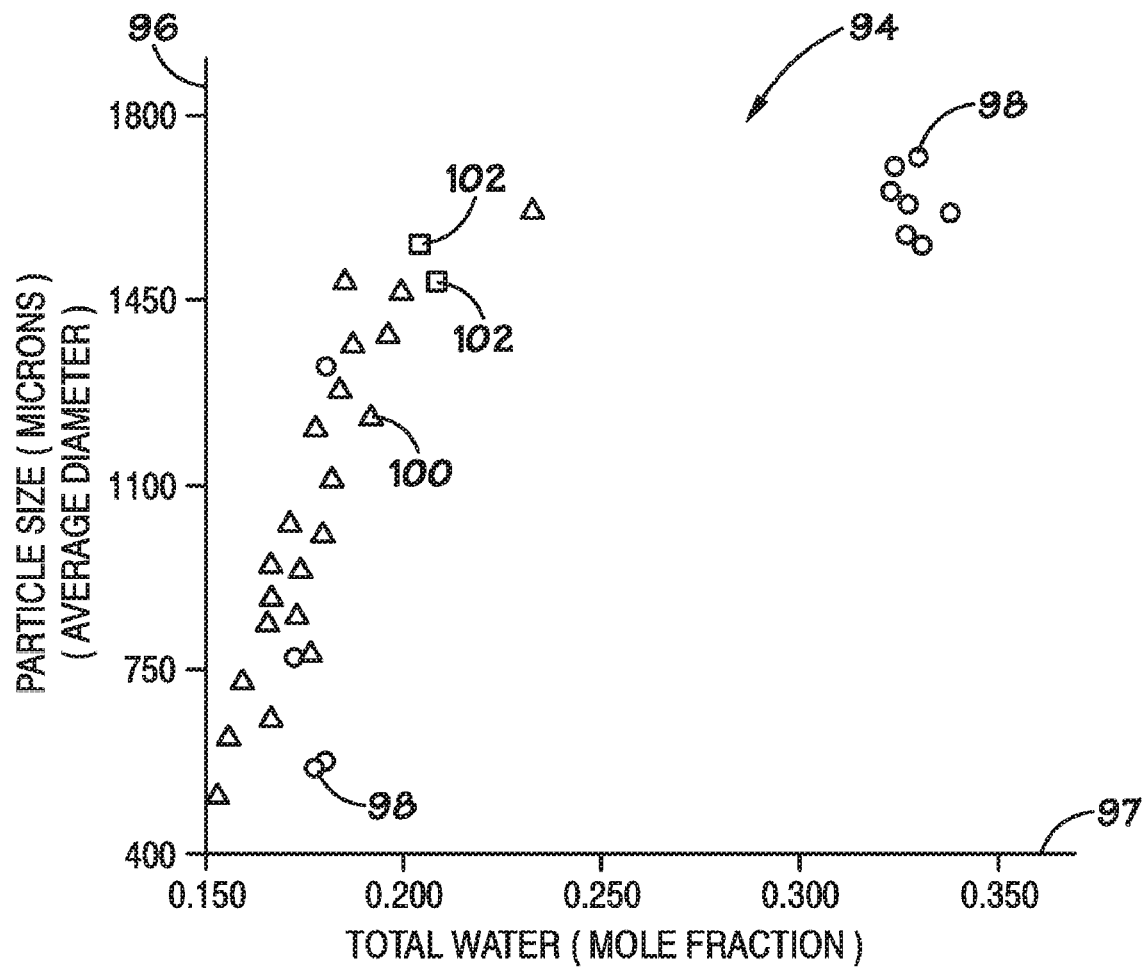
FIG. 6 is a plot of the average diameter of the PPS particle size in microns as a function of reactor agitation speed in revolutions per minute (RPM) and a function of the mole fraction of water in the reactor during quench, in accordance with one embodiment of the present techniques.

In certain applications, it may be beneficial to evaluate the water in the reactor as a concentration in terms of fractions or percents (see FIGS. 5 and 6). For example, where the fluid level in the reactor 14 (see FIGS. 1 and 2) is substantially the same from polymerization to polymerization, or where water concentration is a more meaningful measure than the absolute amount of water (e.g., where historical data is based on concentration), the quench water determination may be based directly on the concentration (e.g., mole fraction) of water existing in the reactor, as referenced by block 76E. It should be noted that the concentration of water in the reactor 14 may be converted to various representations, such as weight percent or mass fraction of water (based on the densities of water and NMP), volume of water (based on the total liquid volume in the reactor 14), mass of water (based on the total liquid volume, and the densities of water and NMP), and so forth.

In addition, the total liquid in the reactor may be measured (block 76F) and the absolute amount of water (i.e., gallons or pounds) in the reactor calculated by multiplying the water fraction by the total liquid (block 76G). The total amount of fluid in the reactor may be directly measured, for example, by a level element or indicator, such as a sight glass or differential pressure meter, with the level indication readily converted to a volume indication based on the geometry of the reactor 14. The amount of quench water to add the reactor 14 may then be calculated by subtracting the amount of water existing in the reactor from the total amount of water desired for terminating the reaction (to give desired PPS particle size), as referenced by block 761. As discussed, the total amount of water desired may be based on known correlations between water and PPS particle size (e.g., average diameter in microns).

Finally, as discussed, it should also be clarified that all actions, ranging from the measuring of process variables to performing the various calculations to physically adding the quench water to the reactor 14, may be performed manually or automatically, or a combination thereof. Automatic reading of measurements, performance of calculations, and control of the process may be accomplished, for example, via the control system 62 (e.g., DCS or PLC) having the appropriate software code, hardware, and equipment. As will be appreciated by those of ordinary skill in the art, a variety of processors, sensors, instrumentation, valve arrangements, control schemes, etc., such as those previously discussed, may be employed to control the various functions of the PPS production and the present techniques. Moreover, it should be emphasized that the order of the different actions of the method 76 depicted in FIG. 4 may vary.

C. Calculated Mole Fraction Increase Versus the Amount of Water Added

FIG. 5 is a representative plot 80 of the calculated increase 82 of mole fraction of water in the reaction mixture versus the actual amount 84 of quench water added to the reaction mixture. Using the reactor temperature and pressure, and Raoult's Law, as discussed above, the mole fraction of water in the reactor prior to quench and after quench is calculated. The difference between these two mole fraction values gives the increase 82 in the mole fraction of water in the reactor 14. The clustering of the data, as well as the realized linear relationship between this increase 82 versus the actual amount 84 of water added supports the use of the present techniques. A linear relationship is expected theoretically with the form of the Raoult's Law equation and with an ideal binary mixture (see part A of Section IV).

As for the representations of the plotted data, six points 86 correspond to no quench water added, leaving an expected calculated value of approximately no increase (zero increase) in the water in the reaction mixture. For one gallon of quench water added to the reaction mixture, two points 88 show a calculated increase in the mole fraction of water of approximately 0.07. Further, at two gallons of water added to the reaction mixture, seven points 90 correspond to an increase in the reaction mixture of about 0.12 mole fraction of water. The approximate linear relationship of the calculated mole fraction increase 82 with the amount 84 of quench water added is depicted by a straight line 92.

D. PPS Particle Size Versus the Mole Fraction of Water During Quench

FIG. 6 illustrates a representation of a plot 94 of the average particle size diameter 96 in microns versus the mole fraction 97 of water (total water) in the reaction mixture after the quench water has been added. The particle size 96 values are measured. The mole fraction 97 (total water) values are calculated based on the approach above of using Raoult's law and the reactor temperature and pressure. Three sets of data, represented by circles 98, triangles 100, and squares 102, are plotted based on three different rotation speeds of the reactor agitator of 350 revolutions per minute (rpm), 400 rpm, and 450 rpm, respectively.

The first set, depicted as circles 98 and based on a 350 rpm agitation speed. At calculated mole fractions of water of about 0.18 and 0.34, the measured PPS particle sizes (average diameters) are about 550 microns and about 1600 microns, respectively. The second set of data are depicted as triangles 100 and based on a 400 rpm agitation speed. The third set of data (two points), depicted as squares 102 and based on an agitation speed of 450 rpm, show a PPS particle size 96 of about 1500 microns at a mole fraction 97 of water of about 0.21. In one interpretation, the relationship between particle size 96 versus the mole fraction 97 increases with a steeper slope at lower mole fractions 97, and becoming asymptotic at higher mole fractions 97. In other words, if the data are fit to a single curve, the single curve representing particle size 96 as a function of mole fraction 97 of water would increase somewhat linearly at a relatively steep slope at lower mole fractions 97 of water, and then flatten at higher mole fractions 97 of water.

It has been observed that the relationship between particle size and the calculated water mole fraction values improves at lower agitation speeds. In other words, less scatter of data is generally realized at agitation speeds below about 500 rpm. Finally, it should be noted that these data sets and other similar types of data may be utilized manually by a human operator or engineer, or automatically in a control scheme, for example, to decide how and what aspects of the present techniques to employ.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of manufacturing polyphenylene sulfide (PPS) polymer, comprising the acts of:
   contacting reactants in a polymerization reactor to form PPS polymer in solution in a mixture in the polymerization reactor; and
   determining an amount of quench water to add to the mixture in the polymerization reactor correlative to an amount of water in the mixture in the polymerization reactor prior to quench.

2. The method as recited in claim 1, comprising the act of calculating the amount of water in the mixture prior to quench based on a temperature and a pressure of the polymerization reactor.

3. The method as recited in claim 1, wherein determining the amount of quench water comprises:

measuring an operating temperature and an operating pressure of the polymerization reactor;

calculating pure-component vapor pressures of an organic solvent and water in the mixture in the polymerization reactor at the operating temperature;

calculating a water fraction of the mixture correlative to the measured operating pressure of the polymerization reactor and to the calculated pure-component vapor pressures, wherein the mixture is assumed to be a binary mixture of the organic solvent and water; and wherein the amount of quench water to add to the mixture in the polymerization reactor is correlative to the water fraction.

4. The method as recited in claim 3, comprising the acts of:

measuring a level of the mixture in the polymerization reactor;

calculating the amount of water in the mixture correlative to the level of the mixture and to the water fraction; and wherein determining the amount of quench water comprises the act of subtracting the calculated amount of water in the mixture from a desired total amount of water in the mixture.

5. The method as recited in claim 3, comprising the act of altering the desired total amount of water in the mixture to change an average particle size of the PPS precipitated from solution in the mixture.

6. The method as recited in claim 1, comprising the act of adding the determined amount quench water to the mixture in the polymerization reactor to generate a specified average particle size of the PPS polymer precipitated from solution in the mixture.

7. The method as recited in claim 1, wherein the act of contacting reactants comprises the act of contacting a sulfur compound and a dihaloaromatic compound in an organic solvent.

8. A system for producing polyphenylene sulfide (PPS) polymer, comprising:

a PPS polymerization reactor;

a quench water inlet disposed on the PPS polymerization reactor and in communication with a water source;

a pressure sensor in communication with the PPS polymerization reactor and configured to measure an operating pressure of the reactor;

a temperature sensor in communication with the PPS polymerization reactor and configured to measure an operating temperature of the PPS polymerization reactor; and a processor configured to determine an amount of quench water based on the operating temperature and the operating pressure.

9. The system as recited in claim 8, wherein the processor is configured to automatically receive measured values of the operating pressure and operating temperature of the PPS polymerization reactor, and to calculate an amount of quench water to add to the PPS polymerization reactor based on the measured values.

10. The system as recited in claim 8, wherein the processor is configured to automatically facilitate control of an addition of quench water to the polymerization reactor.

11. The system as recited in claim 8, comprising a control valve disposed on a water conduit coupled to the quench water inlet, wherein the control valve is configured to receive a signal from the processor to control an addition of quench water to the PPS polymerization reactor.

12. A process for manufacturing a product comprising PPS polymer, the process comprising the act of:

manufacturing a product at least a portion of which comprises PPS polymer, wherein the PPS polymer being produced by a method comprising the acts of:

contacting reactants in a reactor to form the PPS polymer in the reactor;

measuring pressure and temperature of the reactor;

determining an amount of quench water to add to the reactor correlative to the pressure and the temperature, or a combination thereof; and quenching a polymerization of the PPS polymer in the reactor by adding the quench water to the reactor.

\* \* \* \* \*